May 6, 1941.  E. G. L. GIRARD  2,241,125

MOLDING DEVICE WITH EXTENSIBLE CORE

Filed Sept. 28, 1937

E. G. L. Girard
INVENTOR

By Glascock Downing & Seebold
Attys.

Patented May 6, 1941

2,241,125

UNITED STATES PATENT OFFICE 2,241,125

MOLDING DEVICE WITH EXTENSIBLE CORE

Emile Gustave Louis Girard, Paris, France

Application September 28, 1937, Serial No. 166,152
In France April 7, 1937

3 Claims. (Cl. 25—128)

It is known to manufacture molded objects including one or more tubular or semi-tubular recesses, by making use of cores resisting deformation in the diametrical direction, and elastic in the longitudinal direction, so that under the effect of a longitudinal stretching the diameter of said core will be reduced, allowing of easily removing it.

It has been proposed to make such a core of a rubber tube reinforced by one or several spiral springs or spring elements embedded in the wall thereof.

The object of the present invention is to provide a core of this kind which is both easier to remove from the molded piece and less liable to wear and tear.

According to an essential feature of the present invention, the pitch of the metallic helixes embedded in the mass of rubber or other elastic material is such that for a given elongation of the core in the axial direction thereof, the reduction of diameter of each helix is the same as the corresponding reduction of diameter of the rubber or other material, and as this corresponds to a relatively large pitch, I provide a plurality of intertwined helixes arranged in a manner similar to the threads of a multiple screw.

I have found that the condition above stated regarding the pitch of the helixes is complied with when, in the case of a rubber tube reinforced with metallic helixes of a section such that the tensile strength of the reinforcements is equal to that of the rubber element, the pitch of the helixes is approximately $D \times \sqrt{2}$, $D$ being the diameter of the tube.

In this case, supposing, for instance, that the diameter of the tube is 30 centimeters, the pitch of the helixes is 43 centimeters. In order to ensure a satisfactory rigidity of the structure, I provide a plurality of parallel intertwined helixes, say 43 helixes arranged at one centimeter from one another, in a manner analogous to the arrangement of the successive threads of a multiple thread screw.

Other features of the present invention will be hereinafter described, with reference to the accompanying drawing, given merely by way of example, and in which.

Figure 1:
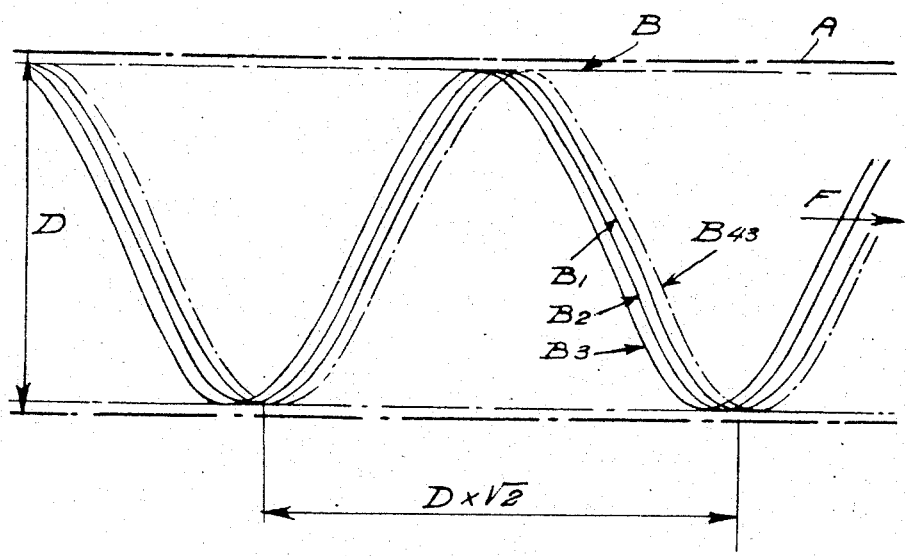
Fig. 1 is an elevation side view showing a part of the metallic reinforcement, the rubber body being supposed to be transparent and indicated by dotted lines.
Figure 2:
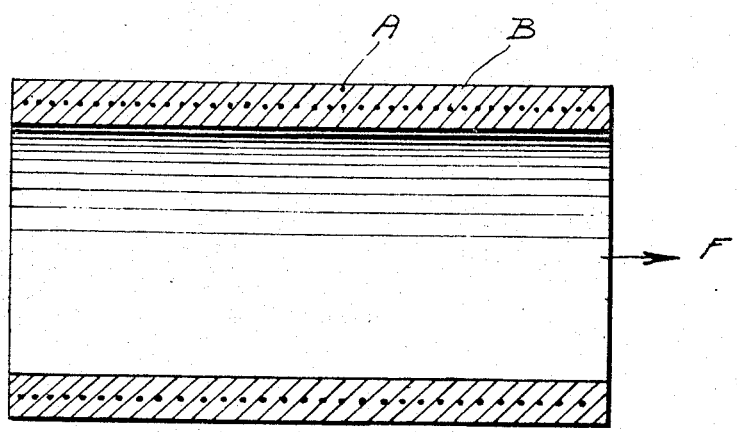
Fig. 2 is a corresponding longitudinal section. The core according to my invention is formed in the known manner of a rubber tube A in which are embedded reinforcing elements consisting of metallic helixes B.

According to my invention, a multiple number of interfitting helixes $B_1$, $B_2$, $B_3$ is provided extending parallelly to one another, the pitch of said helixes being that for which the elongation of the helixes due to a longitudinal traction F, and their reduction in diameter are identical with those taking place in the rubber body A.

It is well understood that the invention shall not be limited to any specific pitch or to any determined number of helixes, the pitch and the number of helixes varying as a function of the degree of elasticity of the body forming the tube A, of the transverse rigidity to be ensured, and so on and further of the value $D \times \sqrt{2}$ which is merely taken as a particular optimum value.

In the following claims, I will call coefficient of reduction of diameter of a tubular structure (this expression including both a continuous structure, such as a rubber tube, and the assembly of a plurality of helixes, such as $B_1$, $B_2$, $B_3$, etc.,) the ratio of the reduction of diameter of said structure to the corresponding elongation (in the direction of the axis) that has produced this reduction of diameter.

While I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

I claim:

1. A mold core which comprises, in combination, a rubber tube, and a plurality of parallel metallic helixes embedded in the wall of said tube, said helixes being intertwined with an arrangement analogous to that of the helixes of a multiple threaded screw, the pitch of each helix being equal to the diameter of the tube multiplied by the square root of 2.

2. A mold core which comprises, in combination, a rubber tube, and at least one metallic helix embedded in the wall of said tube, said helix being formed of at least two elements intertwined in a manner analogous to the helix of a multiple threaded screw and located in the same cylindrical surface, the coefficient of reduction of diameter of said helix being equal to the coefficient of reduction of diameter of said rubber tube upon elongation of the whole.

3. A mold core which comprises, in combination, a tube of an elastic material, a series of metallic helixes embedded in the wall of said tube, said helixes being intertwined with respect to one another, according to an arrangement analogous to that of the helixes of a multiple threaded screw, running all in the same direction and being all located in the same cylindrical surface, the coefficient of reduction of diameter of said series of helixes under the effect of an elongation thereof being equal to the coefficient of reduction of diameter of said elastic tube upon elongation thereof.

EMILE GUSTAVE LOUIS GIRARD.